(No Model.)

G. SCHREYER.
VEHICLE AXLE.

No. 243,730.  Patented July 5, 1881.

Witnesses.

Inventor.
Gottlieb Schreyer
by his attorneys
Bakewell & Kerr

UNITED STATES PATENT OFFICE.

GOTTLIEB SCHREYER, OF COLUMBUS, OHIO.

VEHICLE-AXLE.

SPECIFICATION forming part of Letters Patent No. 243,730, dated July 5, 1881.

Application filed March 21, 1881. (No model.)

*To all whom it may concern:*

Be it known that I, GOTTLIEB SCHREYER, of Columbus, in the county of Franklin and State of Ohio, have invented a new and useful Improvement in Vehicle-Axles; and I do hereby declare the following to be a full, clear, and exact description thereof.

It is my experience that for easy running and general utility it is desirable to have a large spindle for the axles of wagons and similar vehicles. A wooden axle is preferable to a metallic one, because it unites the requisite size with lightness; but it has the objection that great bulk is necessary to obtain the proper strength, and also that it is liable to decay. Where metallic axles and spindles have heretofore been combined, the construction has been such that while adapted for use with light vehicles having small spindles, it was not applicable to vehicles of the class to which this invention more particularly pertains—viz., those having large spindles—for the reason that the increased weight and the liability of the spindle becoming heated were objectionable features.

The object of the present invention is to provide light and strong axles for heavy vehicles; and to this end it consists, mainly, in combining a hollow or tubular spindle with a webbed or flanged metallic axle, whereby lightness and strength are obtained, and the overheating of the spindle is prevented by the circulation of the air within the same.

It also consists in forming the webbed or flanged axle with twisted extremities, so as to bring the flanges into such position at the middle of the axle as to secure the greatest stiffness and strength, and into such position at the extremities as will not obstruct the passage of a linchpin when the same is used.

To enable others skilled in the art to make and use my invention, I will now describe its construction by reference to the accompanying drawings, in which—

Figure 1:
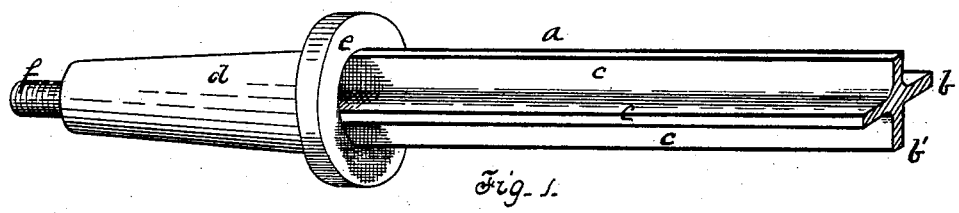
Figure 2:
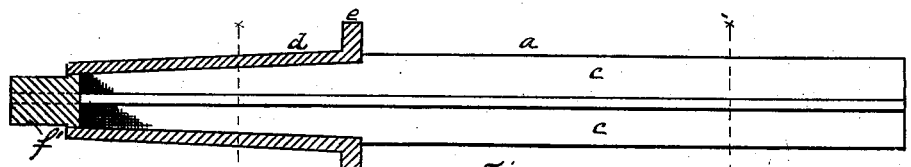
Figure 3:
Figure 4:
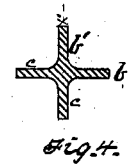
Figure 5:
Figure 6:
Figure 7:
Figure 8:
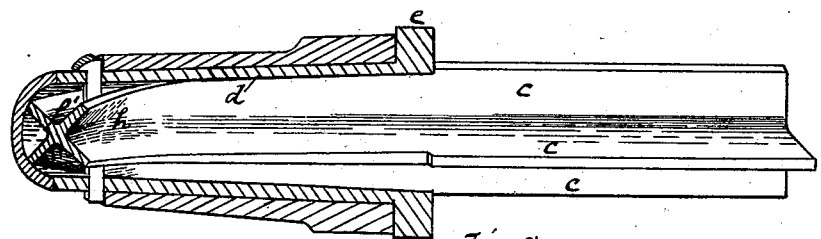

Figure 1 is a perspective view of one end of my improved axle. Fig. 2 is a longitudinal section of the same. Figs. 3 and 4 are cross-sections at $x\,x$ and $x'\,x'$. Figs. 5, 6, and 7 are cross-sections of modified forms of the flanged or webbed axle, and Fig. 8 is a view showing the twist which is given to the extremity of the axle when a linchpin is used.

I make my axle $a$ of flange-iron, the form shown in Fig. 1 being of star shape, having two flat bars, $b\,b'$, crossing each other at right angles. The flanges $c$ may be of any desired height. The spindles are formed by cutting off the flanges $c$ in tapering form and placing upon them a tapering metallic tube, $d$, having a collar or shoulder, $e$, at the inner end. At the outer ends the axle, if a nut is to be used, is made of solid cylindrical form and threaded, as at $f$, for the reception of the nut. The cylindrical part $f$ is formed by filling up the corners $f'$ by suitable filling-pieces of metal, which are welded to the flanges $c$. Where a pin is used instead of a nut the axle is given an eighth turn to bring the corner or cavity $f'$ uppermost, and the pin-hole drilled through the center web, $h$, as shown in Fig. 8. In this case the end of the axle is not solid, but is left of the form of the axle, and in either case the space between the webs and inner wall of the tubular spindle is preferably left open, to permit the unobstructed entrance and circulation of air, though a filling of wood would not be materially objectionable, as it is not calculated to retain the heat as a solid metal spindle or filling would do.

The spindle $d$ may be put on in various ways—for instance, it may be welded on and the collar $e$ shrunk on over it, or it may be cast with the collar $e$ on a chill, the corners $f'$ being filled with suitable removable cores to preserve the tubular form of the spindle, as is well understood in the art of casting, or it may be shrunk on. It is immaterial how the spindle is put on, so long as it is done properly.

The axle $a$ is made of iron, Bessemer steel, or other suitable metal, and may be made by rolling, after which the flanges $c$ are cut off tapering at the ends. The flanges $c$ are made of the proper height to give the desired size of spindle.

My improved axle is not only very strong, but also light enough for practical purposes. Other forms—such as T, channel, and bayonet shape iron, Figs. 5, 6, and 7, and other shapes of flange-iron—may be used; but I prefer the star form described. My improved axle is cheap, light, strong, and has a large spindle.

What I claim as my invention, and desire to secure by Letters Patent, is—

1. The combination, with a flanged or webbed metallic axle, of a tubular spindle, substantially as and for the purpose specified.

2. A webbed or flanged axle having its extremities twisted to turn the flange from a vertical line, to facilitate the insertion of a linchpin, in combination with a tubular spindle, substantially as and for the purpose specified.

In testimony whereof I have hereunto set my hand.

GOTTLIEB SCHREYER.

Witnesses:
T. B. KERR,
R. H. WHITTLESEY.